US008949596B2

(12) United States Patent
Yin et al.

(10) Patent No.: US 8,949,596 B2
(45) Date of Patent: Feb. 3, 2015

(54) ENCRYPTION-BASED SESSION ESTABLISHMENT

(75) Inventors: Fenglin Yin, Lexington, MA (US); Jianxiu Hao, Lexington, MA (US); Zhiying Jin, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 246 days.

(21) Appl. No.: 13/545,369

(22) Filed: Jul. 10, 2012

(65) Prior Publication Data

US 2014/0019752 A1   Jan. 16, 2014

(51) Int. Cl.
*H04L 29/06* (2006.01)

(52) U.S. Cl.
USPC .......... 713/155; 713/150; 713/168; 713/169; 713/182; 726/2; 726/6; 726/7; 726/8; 726/9; 726/20; 709/219; 709/227; 709/228; 709/229; 709/237; 719/318

(58) Field of Classification Search
CPC ..... H04L 63/00; H04L 63/064; H04L 63/068; H04L 63/102; H04L 63/105; H04L 63/205; H04L 63/0815; H04L 63/0869; H04L 63/0884; H04L 67/14; H04L 67/142; H04L 67/146; G06F 21/41
USPC ........................................................ 713/155
See application file for complete search history.

(56) References Cited

U.S. PATENT DOCUMENTS

| | | | | |
|---|---|---|---|---|
| 6,052,785 A * | 4/2000 | Lin et al. | ............................ | 726/5 |
| 6,088,451 A * | 7/2000 | He et al. | ............................ | 726/8 |
| 6,253,193 B1 * | 6/2001 | Ginter et al. | ..................... | 705/57 |
| 6,374,283 B1 * | 4/2002 | Chessell et al. | ............... | 718/101 |
| 6,609,198 B1 * | 8/2003 | Wood et al. | ..................... | 713/155 |
| 6,785,726 B1 * | 8/2004 | Freeman et al. | ............... | 709/227 |
| 6,993,596 B2 * | 1/2006 | Hinton et al. | .................. | 709/250 |
| 7,010,582 B1 * | 3/2006 | Cheng et al. | ................... | 709/219 |
| 7,234,158 B1 * | 6/2007 | Guo et al. | .......................... | 726/2 |
| 7,661,129 B2 * | 2/2010 | Panasyuk et al. | ................ | 726/10 |
| 7,818,792 B2 * | 10/2010 | Shamsaasef et al. | ........... | 726/10 |
| 7,900,247 B2 * | 3/2011 | Chong | ............................. | 726/10 |
| 8,108,920 B2 * | 1/2012 | Spelman et al. | ................... | 726/8 |

(Continued)

OTHER PUBLICATIONS

Rogers, S., et al, 'Single Sign-On Configuration and Troubleshooting for SAS® 9.2 Enterprise BI Web Applications', Paper 365-2011, 2011, SAS Institute, Inc., entire document, http://support.sas.com/resources/papers/proceedings11/365-2011.pdf.*

(Continued)

*Primary Examiner* — Luu Pham
*Assistant Examiner* — Ronald Baum

(57) ABSTRACT

A first server is configured to receive a first token from a user device, determine whether the first token is valid, request the user device to provide a set of credentials to a second server, based on determining that the first token is invalid, and receive a first response from the user device. The first response may include information identifying whether the user device is authenticated to communicate with the first server. The first server is further configured to send the first response to a third server. The third server may generate a second response to indicate authentication of the user device to communicate with the first server. The first server is further configured to receive the second response from the third server, generate a second token, based on receiving the second response, and send the second token to the user device.

23 Claims, 8 Drawing Sheets

(56) References Cited

U.S. PATENT DOCUMENTS

| | | | |
|---|---|---|---|
| 2006/0021004 A1* | 1/2006 | Moran et al. | 726/2 |
| 2006/0282662 A1* | 12/2006 | Whitcomb | 713/156 |
| 2011/0228940 A1* | 9/2011 | Shah et al. | 380/259 |
| 2011/0265159 A1* | 10/2011 | Ronda et al. | 726/6 |

OTHER PUBLICATIONS

Schuster, I., et al, 'Integrating WebSphere Portal with your security infrastructure', Version 4.1, Oct. 2002, IBM Software Group, entire documents, ftp://ftp.software.ibm.com/software/websphere/pdf/WS_Portal_Security_G325.pdf.*

* cited by examiner

| Session Identifier 510 | Expiry timestamp 520 | Previous receipt time 530 | Idle expiry time period 540 | Session key 550 | Locker key 560 | Secure storage value 570 | PCN 580 |
|---|---|---|---|---|---|---|---|
| 1234 | 1/1/01, 23:00:00 | 1/1/01, 15:15:00 | 15 mins | 89d810e8855ace68 2d1843d8cb128fe4 | 4915598f55e5d7a0 daca94fa1f0a63f7 | 0xfbdb1d1b18aa6c0 8324b7d64b71fb763 70690e1d | 487516 |
| 5678 | 1/1/01, 22:00:00 | 1/1/01, 16:30:00 | 60 mins | 89d810e8855ace68 2d1843d8cb128fe5 | 4915598f55e5d7a0 daca94fa1f0a63f8 | 0xfbdb1d1b18aa6c0 8324b7d64b71fb763 70690e1x | 487548 |
| 9012 | 1/1/01, 21:30:00 | 1/1/01, 14:15:00 | 30 mins | 89d810e8855ace68 2d1843d8cb128fe6 | 4915598f55e5d7a0 daca94fa1f0a63f9 | 0xfbdb1d1b18aa6c0 8324b7d64b71fb763 70690e1y | 487651 |

ENCRYPTION-BASED SESSION ESTABLISHMENT

BACKGROUND

Users sometimes use user devices to access content (e.g., videos, images, audio, or some other content) from a content provider via interaction with a content platform. The content provider may authenticate the user device to allow the user device to access the content provider via the content platform. Authenticating the user device to access the content provider may pose security risks for the user device, the content platform and the content provider.

BRIEF DESCRIPTION OF THE DRAWINGS

FIG. 5 illustrates an example data structure that may be stored by one or more servers, such as a platform accounts server;

DETAILED DESCRIPTION OF THE PREFERRED EMBODIMENTS

The following detailed description refers to the accompanying drawings. The same reference numbers in different drawings may identify the same or similar elements.

The systems and/or methods, as described herein, may authenticate a user device to establish a secure session with a platform accounts server in order to allow the user device to access content (e.g., videos, photos, audio, and/or some other content) associated with a partner accounts server. For example, assume that the platform accounts server is a trusted entity with respect to the partner accounts server (e.g., the platform accounts server may access the partner accounts server using a server-to-sever call authorization protocol, such as an OAuth protocol, and/or some other protocol).

In some implementations, the user device may access content from a content distribution server, associated with the partner accounts server, when a session with the platform accounts server is established (e.g., to allow the user device to select and/or receive content via a content platform, associated with the platform accounts server). The systems and/or methods may use multiple authentication responses between trusted servers to authenticate the user device to establish a session with the platform accounts server. Additionally, the systems and/or methods and may further allow the user device to establish a session with the platform accounts server without providing login credentials with each session request.

Additionally, the platform accounts server may establish a session with the user device, based on the platform accounts server receiving a valid session token from the user device. In some implementations, a valid session token may indicate that one or more partner secure token service (STS) servers has authenticated the user device, thereby providing authorization for the platform accounts server to open a session with the user device. For example, the partner STS servers may include a partner identification (ID) STS server, and/or a partner federated STS (FSTS) server used to authenticate the user device.

In some implementations, the platform accounts server may access the partner accounts server to receive information to facilitate content selection and delivery (e.g., via a user interface (UI) associated with the user device). For example, the partner accounts server may store information for a user associated with the content provider, such as authentication information (e.g., a username and/or password), content preferences, content lists, billing information, content subscription information, etc. In some implementations, the platform accounts server may use the information stored by the partner accounts server and present the information in a UI associated with the user device.

Figure 1:
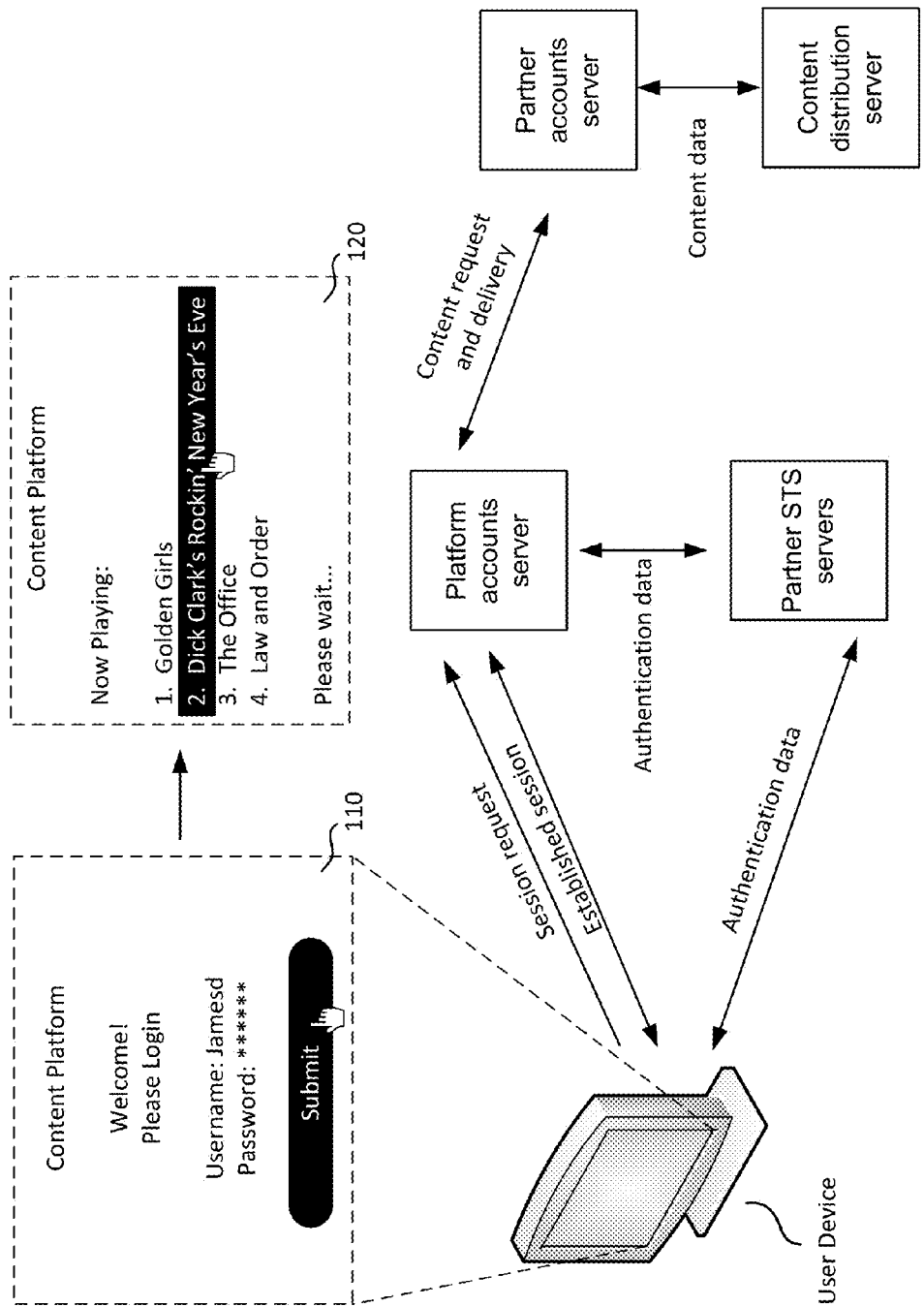
FIG. 1 illustrates an example overview of an implementation described herein.

FIG. 1 illustrates an example overview of an implementation described herein. As shown in FIG. 1, assume that a user, associated with the user device, selects a content platform (e.g., an application associated with the user device used to select and/or receive content from a content provider). Based on selecting a content platform, the user device may send a session request to the platform accounts server. As described above, an established session may allow the user device to communicate with the platform accounts server to select and/or receive content from a content distribution server associated with the partner accounts server. For example, the content distribution server may include protocols and/or instructions to receive content In some implementations, the user device may send the session request to the platform accounts server in the form of a session token. Additionally, the platform accounts server may authenticate the session token (i.e., determine that the session token is valid). For example, the platform accounts server may authenticate the session token by determining that the session token has not expired (e.g., by comparing an expiry timestamp associated with the session token with a current time in which the session token was received), and by calculating a value and comparing the calculated value with the value stored by the secure storage. Additionally, or alternatively, the platform accounts server may authenticate the session token using some other technique, and may establish a session with the user device based on successful authentication of the session token.

As shown in interface 110, assume that the platform accounts server does not authenticate the session token, associated with the session request (e.g., if the session token is expired, if the calculated value does not match the value stored by the secure storage, etc.). The platform accounts server may cause the user device to provide, to the partner STS servers (e.g., the partner ID STS server), login information associated with a user account for a content provider associated with the partner accounts server. Based on the user device providing the login credentials, the partner ID STS server may authenticate the login credentials and provide the user device with a first authentication response (e.g., a response including a token with information identifying that the user device is authenticated). In some implementations, the encrypted first authentication response may include a token generated with the Security Assertion Markup Language (SAML) (e.g., a "SAML token") and may be decrypted only by the partner FSTS server (e.g., may include security assertions interpretable only by the partner FSTS server).

Additionally, the user device may provide the first authentication response to the platform accounts server (e.g., as an input for a session request with the platform accounts server), and the platform accounts server may provide the encrypted first authentication response to the partner FSTS server. The partner FSTS server may decrypt the first authentication response (e.g., to identify that the user device is authenticated), and send a second authentication response to the platform accounts server. In some implementations, the second authentication response may include an indication that the user device is authenticated to access the partner accounts server via the platform accounts server (e.g., via a session with the platform accounts server).

Additionally, the platform accounts server may receive and decrypt the second authentication response to determine that the user device is authenticated to access the partner accounts server via the platform accounts server. Based on the determination, the platform accounts server may receive a customer number, associated with the login credentials provided by the user device to the partner ID STS server, generate a session token associated with the customer number, and send the session token to the user device.

As shown in interface 120, assume that the platform accounts server receives a session token and authenticates the session token (e.g., determines that the session token is not expired and/or that the calculated value matches the value stored by the secure storage associated with the session token). The platform accounts server may establish a secure session with the user device, thereby allowing the user device to interact with the platform accounts server to select content associated with the partner accounts server.

In some implementations, the user device may forgo presenting interface 110 and present only interface 120. For example, in a situation in which the user device sends a session request (e.g., in the form of a session token) to the platform accounts server and the platform accounts server authenticates the user device (e.g., authenticates the session token included in the session request), the user device may forgo presenting interface 110, thereby allowing the user device to communicate with the platform accounts server without providing login credentials to the partner ID STS server.

Figure 2:
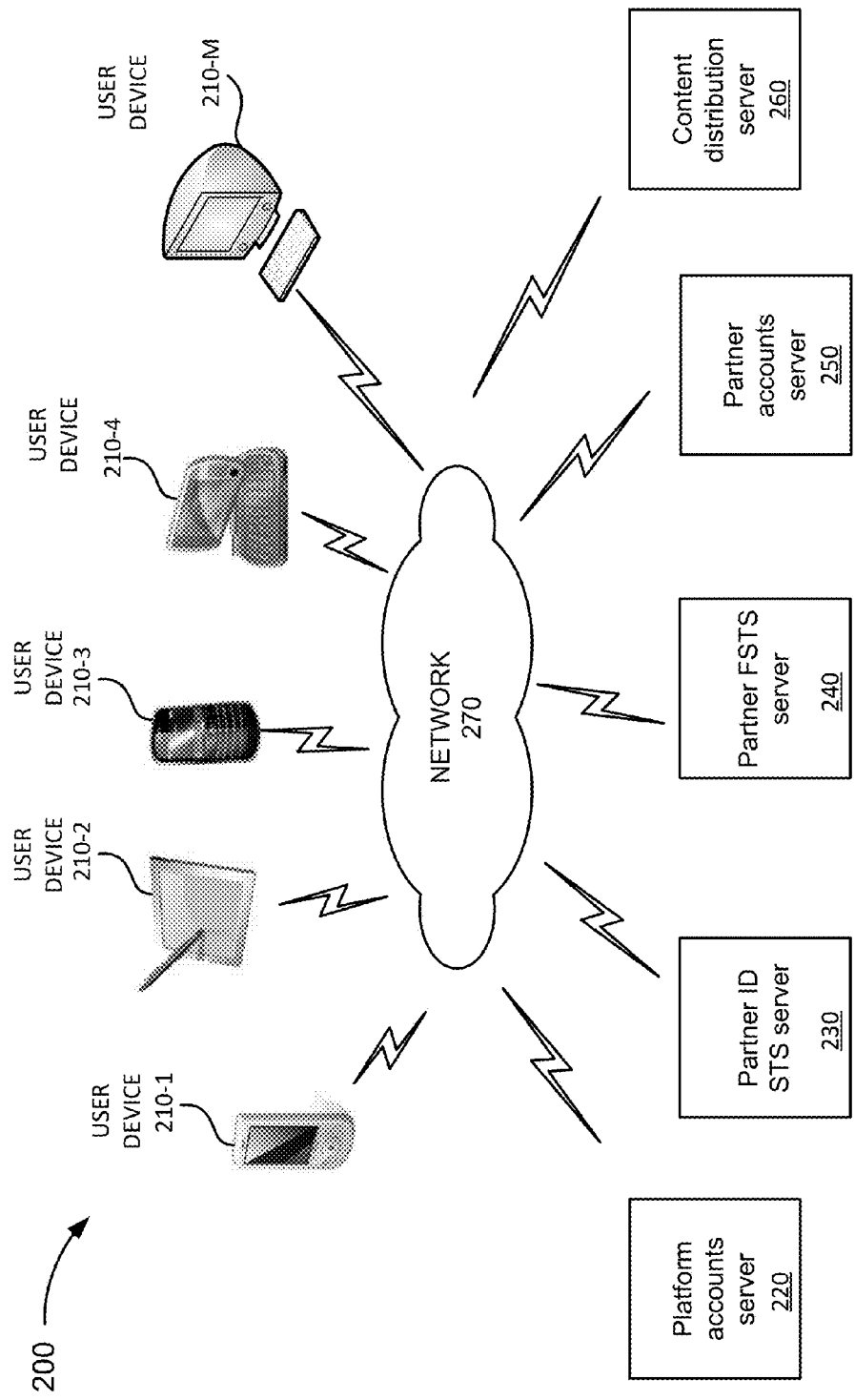
FIG. 2 illustrates an example environment in which systems and/or methods, described herein, may be implemented.

FIG. 2 is a diagram that illustrates an example environment 200 in which systems and/or methods, described herein, may be implemented. As shown in FIG. 2, environment 200 may include user device 210-1, user device 210-2, ..., user device 210-M (where M≥1) (collectively referred to as "user devices 210," and individually as "user device 210"), platform accounts server 220, partner STS server 230, partner FSTS server 240, partner accounts server 250, content distribution server 260, and/or network 270. While FIG. 2 shows a particular quantity and arrangement of devices, in practice, environment 200 may include additional devices, fewer devices, different devices, or differently arranged devices than are shown in FIG. 2. For example, each of servers 220-260 may be implemented as multiple, possibly distributed, devices. Alternatively, two or more of servers 220-260 may be implemented within a single device. Further, a function described as being performed by one server may be performed by another server.

User device 210 may include any portable or non-portable device capable of communicating via a network, such as network 270. For example, user device 210 may correspond to a mobile communication device (e.g., a smart phone or a personal digital assistant (PDA)), a portable computer device (e.g., a laptop or a tablet computer), or another type of portable device. User device 210 may also, or alternatively, include a client device, such as a set top box for a television, a digital video recorder (DVR) or player, a desktop computer, a gaming device, or the like.

Platform accounts server 220 may include a computing device, such as a server device or a collection of server devices. In some implementations, platform accounts server 220 may include a server device that receives and/or stores information associated with a user account for a content delivery platform. For example, platform accounts server 220 may receive and/or store information to allow user device 210 to access content from content distribution server 260 (e.g., via partner accounts server 250). For example, platform accounts server 220 may include information, such as user device types (game consoles, mobile phones, tablets, desktop computers, portable computers, etc.), content entitlement rights (content subscriptions, rentals, purchases, permission levels for accessing particular content, etc.), parental controls, content purchase/rental history, and/or some other information. Additionally or alternatively, platform accounts server 220 may include certificate information, such as a public key, a private key, an X.509 v3 certificate, and/or some other certificate, key, or authentication information and/or protocol.

Partner ID STS server 230 may include a computing device, such as a server device or a collection of server devices. In some implementations, partner ID STS server 230 may include a server device that receives and/or stores information associated with user account information for a content delivery reseller. For example, partner ID STS server 230 may store login information for a user account, associated with the content delivery reseller. Additionally, or alternatively, partner ID STS server 230 may receive login information from user device 210, and generate an encrypted first authentication response (e.g. a SAML token) interpretable by partner FSTS server 240 based on authenticating the login information. Additionally or alternatively, partner ID STS server 230 may generate some other type of token based on authenticating the login information. Additionally, or alternatively, partner ID STS server 230 may include a server device, or collection of server devices, to perform some other authentication function for some other purpose.

Partner FSTS server 240 may include a computing device, such as a server device or a collection of server devices. In some implementations, partner FSTS server 240 may include a server device that receives and/or stores information associated with a user account for a content delivery reseller. Additionally, or alternatively, partner FSTS server 240 may receive an encrypted first authentication response from platform accounts server 220, decrypt and/or validate the first authentication response (e.g., validate a signature associated with the first authentication response to determine that the token was created by a trusted source, such as partner ID STS server 230), and/or generate an encrypted second authentication response (e.g., a response in the form of a SAML token), interpretable by platform accounts server 220. Additionally, or alternatively, partner FSTS server 240 may include a server device, or collection of server devices, to perform some other authentication function for some other purpose.

Partner accounts server 250 may include a computing device, such as a server device or a collection of server devices. In some implementations, partner accounts server 250 may include a server device that receives and/or stores information associated with a user account for a content delivery reseller. For example, partner accounts server 250 may receive and/or store information associated with a user account. In some implementations, the information stored by partner accounts server 250 may include information to allow user device 210 to receive content from content distribution server 260. For example, partner accounts server 250 may include information, such as billing information, subscription credits, login credentials, and/or some other information. Additionally, or alternatively, partner accounts server 250 may provide information to platform accounts server 220 to allow user device 210 to interact with platform accounts server 220 to select content (e.g., via a UI of user device 210).

In practice, it will be apparent that, at any given time, platform accounts server 220 may also act as a partner accounts server 250. Additionally, or alternatively, platform accounts server 250 or partner accounts server 220 may perform the functions of both a platform accounts server 220 and as a partner accounts server 250.

Content distribution server 260 may include a computing device, such as a server device or a collection of server devices. In one implementation, content distribution server 260 may include a server that stores, processes, and/or delivers content to user device 210. Content distribution server 260 may store content, such as broadcast content, on demand content, web content, and/or some other content. Additionally, or alternatively, content distribution server 260 may include content from a content originator and/or a content reseller. Content distribution server 260 may store content in encrypted form or unencrypted form. Additionally or alternatively, content distribution server 260 may permit user device 210 to access content once user device 210, has been properly authenticated (e.g., based on partner ID STS server 230 establishing a secure session with user device 210).

Servers 230-260 may be associated with a party different from a party associated with platform accounts server 220. Additionally or alternatively, environment 200 may include multiple groups of servers 230-260. In this case, each of the multiple groups of servers 230-260 may be associated with a respective party, which may differ.

In one implementation, the interactions between servers 220-260 may be performed using the hypertext transfer protocol (HTTP), the secure HTTP (HTTPS), the simple object access protocol (SOAP), and/or another secure protocol. In one implementation, the interactions between servers 220-260 may be performed using another type of protocol or combination of protocols.

Network 270 may include any type of network or a combination of networks. For example, network 270 may include a local area network (LAN), a wireless LAN (WLAN), a wide area network (WAN) (e.g., the Internet), a metropolitan area network (MAN), an ad hoc network, a telephone network (e.g., a Public Switched Telephone Network (PSTN), a cellular network, or a voice-over-IP (VoIP) network), a fiber optic (e.g., FiOS), or a combination of networks. Each of user device 210, platform accounts server 220, partner STS server 230, partner FSTS server 240, partner accounts server 250, and/or content distribution server 260 may connect to network 270 via a wireless connection, a wired connection, or a combination thereof.

Figure 3:
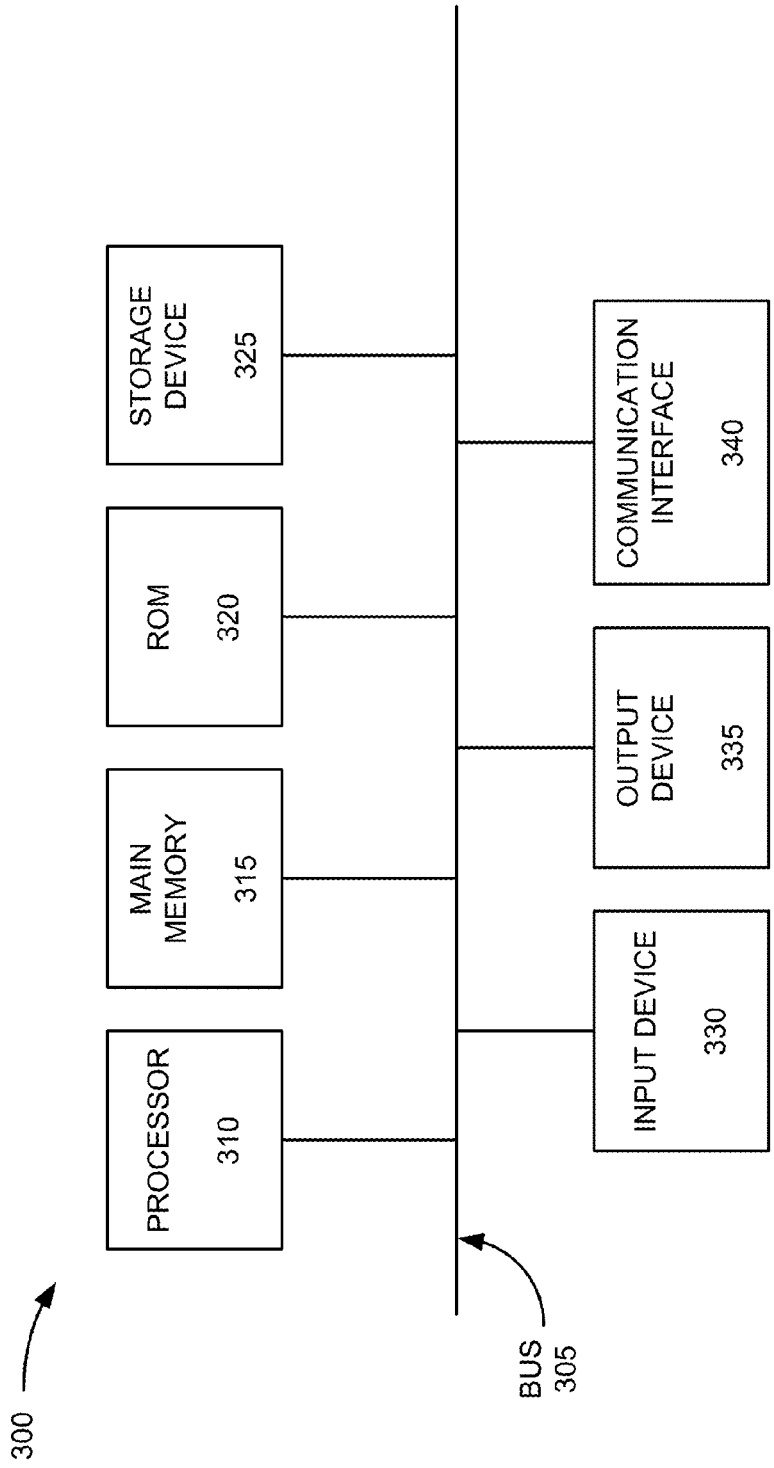
FIG. 3 illustrates example components of a device that may be used within the environment of FIG. 2.

FIG. 3 illustrates example components of a device 300 that may be used within environment 200 of FIG. 2. Device 300 may correspond to user device 210 and/or servers 220-260. Each of user device 210 and/or one or more of servers 220-260 may include one or more devices 300, and/or one or more components of device 300.

As shown in FIG. 3, device 300 may include a bus 305, a processor 310, a main memory 315, a read only memory (ROM) 320, a storage device 325 (also referred to as a local storage device or local storage), an input device 330, an output device 335, and a communication interface 340. In some implementations, device 300 may include additional components, fewer components, different components, or differently arranged components.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a mechanism that permits an operator to input information to device 300, such as a control button, a keyboard, a keypad, or another type of input device. Output device 335 may include a mechanism that outputs information to the operator, such as a light emitting diode (LED), a display, or another type of output device. Communication interface 340 may include any transceiver-like mechanism that enables device 300 to communicate with other devices or networks. In one implementation, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical memory device or spread across multiple physical memory devices.

The software instructions may be read into main memory 315 from another computer-readable medium, such as storage device 325, or from another device via communication interface 340. The software instructions contained in main memory 315 may cause processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
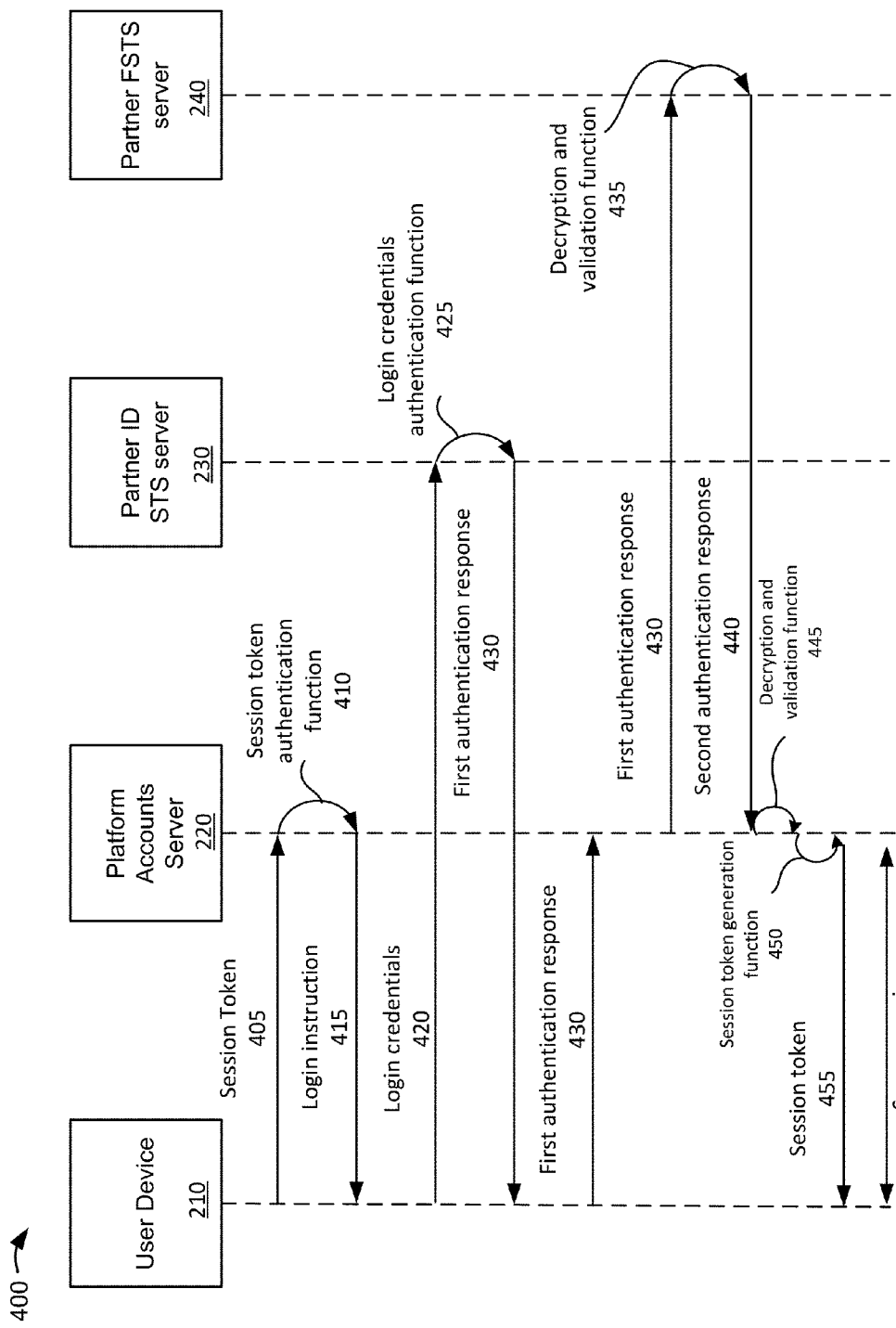
FIG. 4 illustrates example functional components of an example system.

FIG. 4 illustrates a call flow diagram of example operations capable of being performed by an example portion 400 of environment 200. As shown in FIG. 4, portion 400 may include user device 210, platform accounts server 220, partner ID STS server 230, and partner FSTS server 240. User device 210, platform accounts server 220, partner ID STS server 230, and/or partner FSTS server 240 may include components and/or perform functions described above in connection with, for example, FIGS. 1 and 2.

FIG. 4 may correspond to example operations and/or functions to authenticate a first session token and/or to generate a second session token based on failing to authenticate the first session token (i.e., determining that the first session token is invalid). Additionally, or alternatively, FIG. 4 may correspond to example operations and/or functions to establish a secure session between user device 210 and platform accounts server 220 based on platform accounts server 220 authenticating a session token.

As shown in FIG. 4, user device 210 may send session token 405 to platform accounts server 220 (e.g., as an input to a session request with platform accounts server 220). In some implementations, session token 405 may include a session identifier, an expiry timestamp, idle expiry time period, an encrypted session key, an encrypted secure storage, and a value stored by the secure storage. In some implementations, the value stored by the secure storage may include a value generated based on an input parameter (e.g., a private key associated with platform accounts server 220 and/or some other parameter) and an algorithm (e.g., a hash-based message authentication code (HMAC) algorithm, or some other algorithm). Some examples of a session identifier (ID), an expiry timestamp, idle expiry time period, an encrypted session key, an encrypted secure storage, and a value stored by the secure storage are later described with respect to FIG. 5.

Platform accounts server 220 may receive session token 405 and may initiate session token authentication function 410 to authentication session token 405 (i.e., determine if session token 405 is valid). For example, platform accounts server 220 may authenticate session token 405 by determining that session token 405 is unexpired, and/or calculating a value and determining that the calculated value matches the value stored by the secure storage. Additionally, or alternatively, platform accounts server 220 may authenticate session token 405 using some other technique.

In some implementations, platform accounts server 220 may determine that session token 405 is unexpired by comparing a local time at which session token 405 was received with the expiry timestamp of the session token. Additionally or alternatively, platform accounts server 220 may determine if session token 405 is expired by comparing a time period in which session token 405 was last received by platform accounts server 220 with the idle expiry time period associated with session token 405. For example, assume that session token 405 was received on Jan. 1, 2001 at 13:00:00 and on Jan. 1, 2001 at 13:05:00. Platform accounts server 220 may determine a time period of 5 minutes and compare the determined time period with the idle expiry time period and identify whether the determined time period exceeds the idle expiry time period.

Additionally or alternatively, platform accounts server 220 may calculate a value associated with session token 405. For example, platform accounts server 220 may calculate the value based on input parameters (e.g., the session identifier, expiry timestamp, session key, and/or some other parameter) associated with session token 405 and an algorithm. In some implementations, the algorithm used to calculate the value may be based on a cryptographic hash function, an HMAC-MD5, an HMAC-SHA1, and/or some other type of algorithm.

As described above, platform accounts server 220 may compare the calculated value with the value stored by the secure storage associated with session token 405. In some implementations, and as described above, session token 405 may include a session key (e.g., a random AES 128-bit key and/or some other key) encrypted by a public key, associated with platform accounts server 220. Platform accounts server 220 may decrypt the session key using a private key associated with platform accounts server 220, and may use the decrypted session key to decrypt the secure storage associated with session token 405. Additionally, platform accounts server 220 may identify the value stored by the secure storage, based on decrypting the secure storage. As described above, platform accounts server 220 may compare the calculated value with the value stored by the secure storage, and authenticate session token 405 based on identifying whether the calculated value matches the value stored by the secure storage.

In some situations, platform accounts server 220 may fail to authenticate session token 405 (e.g., by determining that session token 405 is expired and/or that the calculated value does not match the value stored by the secure storage associated with session token 405). Based on platform accounts server 220 failing to authenticate session token 405, platform accounts server 220 may send login instruction 415 to user device 210. For example, login instruction 415 may cause user device 210 to display a login screen associated with partner accounts server 250 (e.g., to allow user device 210 to provide partner accounts server 250 with login credentials). An example of login instruction 415 is described above with respect to interface 110 of FIG. 1.

User device 210 may receive login credentials 420 (e.g., by receiving an input of the login credentials, such as a username and/or password) from a user, associated with user device 210. Additionally, user device 210 may provide login credentials 420 to partner ID STS server 230. Partner ID STS server 230 may receive login credentials 420 and may initiate login credentials authentication function 425. For example, as described above, partner ID STS server 230 may store login information associated with a user account and may determine whether login credentials 420 match the login credentials stored by partner ID STS server 230.

Partner ID STS server 230 may further generate first authentication response 430 based on authenticating login credentials 420. For example, first authentication response 430 may include a token (e.g., a token in accordance with the security assertion markup language (SAML), referred to as a "SAML token") to identify that user device 210 is authenticated to access partner accounts server 250 via a session with platform accounts server 220. Additionally, or alternatively, first authentication response 430 may be structured in accordance with the WS-trust standard specification or some other specification. In some implementations, first authentication response 430 may include a SAML token signed and/or encrypted by partner ID STS server 230 (e.g., to identify that first authentication response 430 was created by partner ID STS server 230). For example, partner ID STS server 230 may sign first authentication response 430 by creating a value based on an input (e.g., a private key associated with partner ID STS server 230) and an algorithm (such as a hash-based algorithm or some other algorithm). Additionally, or alternatively, first authentication response 430 may include security assertions which may be interpretable only by partner FSTS server 240. Partner ID STS server 230 may further send first authentication response 430 to user device 210.

In some implementations, user device 210 may send first authentication response 430 to platform accounts server 220 (e.g., as an input to a session request with platform accounts server 220). Platform accounts server 220 may receive first authentication response 430 from user device 210, and provide first authentication response 430 to partner FSTS server 240 (e.g., to identify whether user device 210 is authenticated to access partner accounts server 250 via a session between user device 210 and platform accounts server 220). Partner FSTS server 240 may initiate decryption and validation function 435 based on receiving first authentication response 430 (e.g., to identify whether partner ID STS server 230 authenticated user device 210 and to validate whether first authentication response 430 was created by partner ID STS server 230). As described above, first authentication response 430 may include security assertions interpretable by partner FSTS server 240. Partner FSTS server 240 may decrypt first authentication response 430 (e.g., using a decryption key associated with partner FSTS server 240 and/or some other technique), validate first authentication response 430 (e.g., using a validation technique, such as a hash calculation and comparison technique to validate the signature associated with partner ID STS server 230), and generate second authentication response 440 based on decrypting and/or validating first authentication response 430.

Additionally, partner FSTS server 240 may encrypt and sign second authentication response 440. In some implementations, second authentication response 440 may be structured in accordance with the WS-trust standard specification or some other specification. Additionally, or alternatively, partner FSTS server 240 may sign second authentication response 440 by creating a value based on an input (e.g., a private key associated with partner FSTS server 240) and an algorithm (such as a hash-based algorithm or some other algorithm). As described above, second authentication response 440 may include information to indicate that user device 210 is authenticated to access partner accounts server 250 via a secure session with platform accounts server 220. Additionally, or alternatively, second authentication response 440 may include a partner customer number (PCN) associated with login credentials 420 provided by user device 210. Additionally, or alternatively, second authentication response 440 may include security assertions interpretable by platform accounts server 220.

In some implementations, platform accounts server 220 may receive second authentication response 440 and may initiate decryption and validation function 445. For example, platform accounts server 220 may decrypt second authentication response 440 (e.g., using a key associated with platform accounts server 220 and/or some other technique), and validate second authentication response 440 (e.g., using a validation technique, such as a hash calculation and comparison technique to validate the signature associated with partner FSTS server 240 in order to verify that second authentication response 440 was created and sent by partner FSTS server 240) in manner similar to function 435 as described above.

Additionally, platform accounts server 220 may execute session token generation function 450 based on decrypting and/or validating second authentication response 440. For example, platform accounts server 220 may generate session token 455 based on executing session token generation function 450. As described above, session token 455 may include a session identifier, an expiration timestamp, an idle expiry time period, a session key encrypted by a public key associated with platform accounts server 220, a secure storage encrypted by the session key, a PCN associated with second authentication response 440, and/or a value stored by the secure storage (e.g., a value calculated by platform accounts server 220 using an HMAC-MD5 algorithm, an HMAC-SHA1 algorithm, and/or some other algorithm based on a private key and/or some other parameter associated with session token). Additionally, platform accounts server 220 may send session token 455 to user device 210 (e.g., via a secure channel protocol and/or some other protocol).

In the situation where platform accounts server 220 receives a session token from user device 210 and platform accounts server 220 authenticates session token (e.g., in a manner as described above), platform accounts server 220 may generate secure session 460 with user device 210, and may identify the user account information based on the customer number associated with the session token. Further, user device 210 may interact with platform accounts server 220 via secure session 460 to select content and access content associated with partner accounts server 250 (e.g., via a UI of user device 210). As described above, the session token may allow user device 210 to access platform accounts server 220 via secure session 460 in a manner such that user device 210 may forgo providing login information to platform accounts server 220 and/or partner accounts server 250 (e.g., when platform accounts server 220 authenticates the session token provided by user device 210 when user device 210 requests a secure session with platform accounts server 220).

FIG. 5 illustrates an example data structure 500 that may be stored by one or more servers, such as platform accounts server 220. In one implementation, data structure 500 may be stored in a memory of platform accounts server 220. In another implementation, data structure 500 may be stored in a memory separate from, but accessible by platform accounts server 220. Platform accounts server 220 may store multiple data structures 500 associated with session token information as described above, and/or with some other information. Additionally, or alternatively, each row of data structure 500 may identify information associated with a session token. A particular instance of data structure 500 may contain different information and/or fields than another instance of data structure 500. Additionally or alternatively, some information stored by data structure 500 may correspond to information stored by a session token (e.g., a session identifier, an expiry timestamp, an idle expiry time period, a session key, a secure storage key, a value stored by the secure storage, and/or a PCN).

As shown in FIG. 5, data structure 500 may include session identifier field 510, expiry timestamp field 520, previous receipt time field 530, idle expiry time period field 540, session key field 550, secure storage key field 560, secure storage value field 570, and PCN field 580. In some implementations, data structure 500 may include additional fields, fewer fields, different fields, or differently arranged fields than are shown in FIG. 5. Information stored by data structure 500 may allow platform accounts server 220 to authenticate a session token received in response to a session request with user device 210.

Session identifier field 510 may include a string of characters to identify a session token. Session identifier field 510 may store a unique string of characters such that no two strings of characters are alike. Additionally, while the example shown in FIG. 5 shows the session identifier field as four numeric digits (e.g., "1234"), in practice, session identifier field may store any character string including alphanumerical characters, or some other characters.

Expiry timestamp field 520 may include information identifying a time at which a session token, associated with the corresponding session identifier, will expire (e.g., after which platform accounts server 220 will fail to authenticate the session token). For example, assume that platform accounts server 220 receives a session token associated with the session identifier "1234" on Jan. 1, 2001, at 23:05:00. Platform accounts server 220 may identify that the session token is expired since the time of receipt of the session token is after the expiry timestamp associated with the session token.

Previous receipt time field 530 may include information identifying a time at which a session token, associated with the corresponding session identifier, was previously received. For example, assume that platform accounts server 220 received a session token associated with the session identifier "1234" on Jan. 1, 2001 at 15:15:00. Previous receipt time field 530 may store Jan. 1, 2001, 15:15:00 as the previous receipt time. The information in previous receipt time field 530 may be used to identify whether the session token has expired with respect to an idle expiry time period associated with the session token.

Idle expiry time period 540 may include information identifying a time period in which a session token, associated with the corresponding session identifier, will expire based on inactivity of the session token. For example, as shown in FIG. 5, the idle expiry time period associated with the session token with the session identifier "1234" is 15 minutes. Platform accounts server 220 may identify whether the idle expiry time period has been exceeded based on information associated with previous receipt time field 530 and idle expiry time period field 540. For example, assume that platform accounts server 220 receives the session token associated with session identifier "1234" on Jan. 1, 2001 at 15:31:00. Based on information associated with previous receipt time field 530 (e.g., Jan. 1, 2001, 15:15:00), platform accounts server 220 may determine a time period (e.g., an idle time period) of 16 minutes (e.g., the time difference between the receipt time of the session token and the time information stored by previous receipt time field 530). Platform accounts server 220 may further identify that the idle time period (i.e., 16 minutes) exceeds the time period stored by idle expiry time period 540 (i.e., 15 minutes). Based on identifying that the idle time period exceeds the time period stored by idle expiry time period 540, platform accounts server 220 may fail to authenticate the session token.

Session key field 550 may include information identifying a session key (e.g., a 128-bit AES key, and/or some other key) stored by a session token, associated with the corresponding session identifier. In some implementations, the session key may be generated based on a private key associated with platform accounts server 220. Additionally, or alternatively, the session key may be generated using some other technique. As shown in FIG. 5, session key field 550 may store the key "89d810e8855ace682d1843d8cb128fe4" associated with the session token with session identifier "1234." As described above, the session key may be used to generate, encrypt, and/or decrypt a secure storage key.

Secure storage key field 560 may include information identifying a secure storage key (e.g., a 128-bit AES key, and/or some other key) stored by a session token associated with the corresponding session identifier. In some implementations, the secure storage key may be generated, encrypted, and/or decrypted by a session key, as described above. As shown in FIG. 4, secure storage key field 560 may store the key "4915598f55e5d7a0daca94falf0a63f7" associated with the session token with the session identifier "1234." The secure storage key may be used to secure a digital secure storage (e.g., using a secure digital protocol and/or some other protocol) storing a value (e.g., an HMAC value or some other value).

Secure storage value field 570 may include information identifying a value stored by a secure storage of a session token associated with the corresponding session identifier. As described have, platform accounts server 220 may determine the value based on an HMAC-MD5 algorithm, an HMAC-SHA1 algorithm, and/or some other algorithm with inputs, such as the private key associated with platform accounts server 220 or some other value. Additionally, or alternatively, secure storage value field 570 may include information identifying some other value based on some other hash value generation algorithm and/or technique.

PCN field 580 may include information identifying a PCN stored by a session token associated with the corresponding session identifier. In some implementations, the PCN may include a string of characters identifying an account associated with a user of partner accounts server 250 (e.g., an account for a subscriber of content delivery services). In the example shown in FIG. 5, PCN field 580 may store the character string "487516" associated with the session token with session identifier "1234." In some implementations, platform accounts server 220 may identify information for the account associated with the PCN (i.e., "487516") based on receiving and authenticating the session token with the session identifier "1234." As described above, platform accounts server 220 may use the information for the account associated with the PCN to allow user device 210 to select content (e.g., via a UI of user device 210).

While information associated with data structure 500 is described as being stored by platform accounts server 220, in practice, platform accounts server 220 may use information associated with data structure 500 to create a session token based on information associated with data structure 500 without storing some information associated with data structure 500. For example, as described above with respect to session token generation function 450, platform accounts server 220 may generate a session token which includes a session identifier, an expiry timestamp, an idle expiry time period, a session key, a secure storage key, a value stored by the secure storage, and/or a PCN. Additionally, platform accounts server 220 may forgo storing the session key, the secure storage key, and/or the value stored by the secure storage (e.g., in order to prevent the possibility of theft of the session key, the secure storage key, and/or the value stored by the secure storage). As described above with respect to session token authentication function 410, platform accounts server 220 may determine the session key, the secure storage key, and the value stored by the secure storage to authenticate a session token without storing the session key, the secure storage key, and the value stored by the secure storage.

Figure 6:
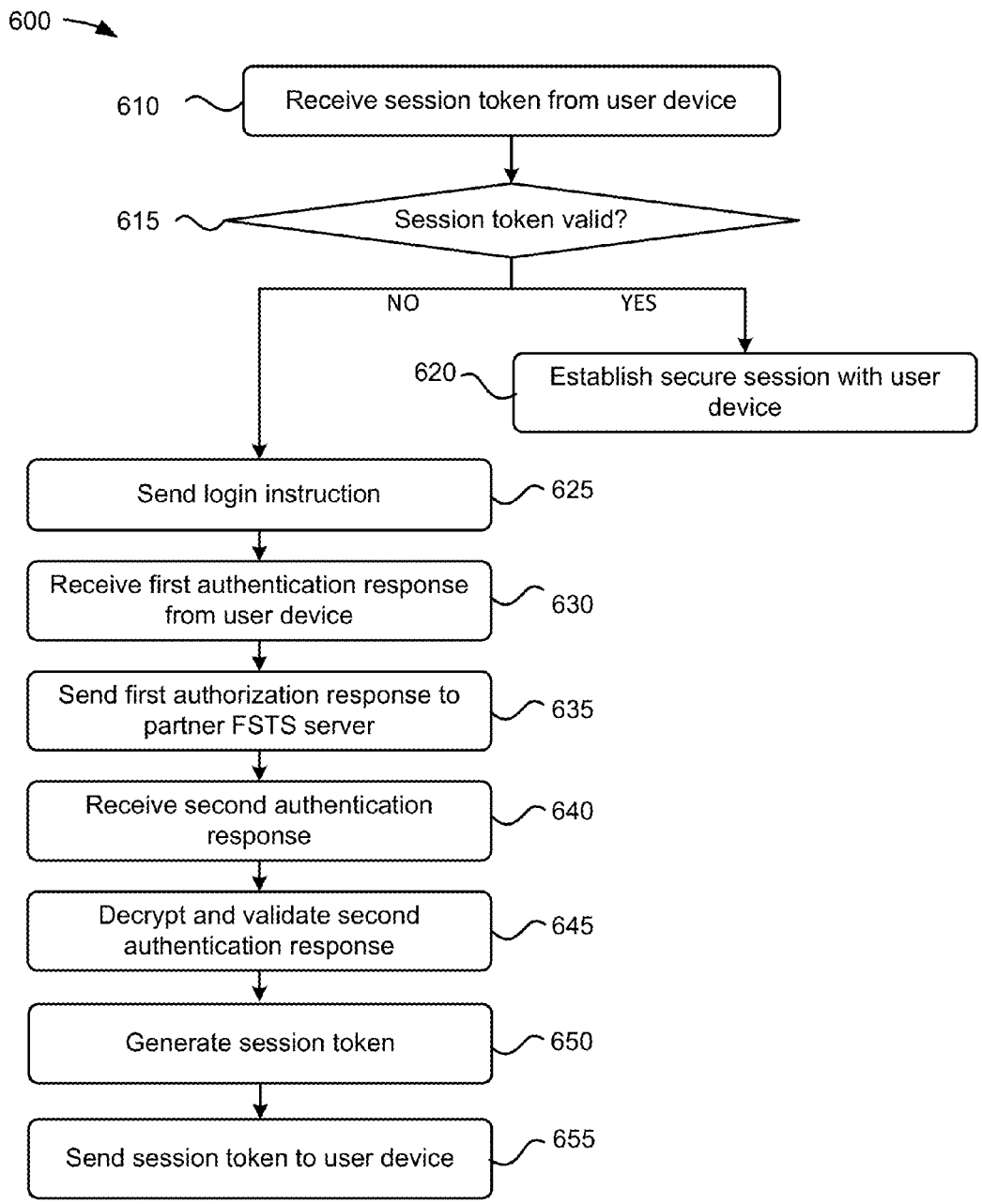
FIG. 6 illustrates a flowchart of an example process for establishing a secure session with a user device.

FIG. 6 illustrates a flowchart of an example process 600 for establishing a secure session with user device 210. In one implementation, process 600 may be performed by one or more components of platform accounts server 220, such as processing unit 305 of platform accounts server 220. In another implementation, one or more blocks of process 600 may be performed by one or more components of another device (e.g., one or more of servers 230-260), or a group of devices including or excluding platform accounts server 220.

As shown in FIG. 6, process 600 may include receiving a session token (e.g., a first session token) from user device 210 (block 610). For example, as described above with respect to session token 405, platform accounts server 220 may receive session token 405 from user device 210 (e.g., as an input for a session request with platform accounts server 220).

Process 600 may further include determining whether the session token is valid (block 615). For example, as described above with respect to session token authentication function 410, platform accounts server 220 may determine whether session token 405 is valid and/or authentic based on authenticating session token 405. As described above, platform accounts server 220 may authenticate session token 405 by determining that session token 405 is unexpired, and/or calculating a value (e.g., an HMAC value or some other value) and determining that the calculated value matches the value stored by the secure storage associated with session token 405. In some implementations, platform accounts server 220 may use a private key to decrypt a session key associated with session token 405. Additionally, platform accounts server 220 may use the decrypted session key to decrypt the secure storage key associated with session token 405 in order to identify the value stored by the secure storage.

If, for example, platform accounts server platform accounts server 220 determines that the session token is valid—e.g., by authenticating the session token (block 615—YES), process 600 may further include establishing a secure session with user device 210 (block 620). For example, platform accounts server 220 may establish a secure session with user device 210 using a secure transfer protocol, such as the HTTPS protocol, the SOAP protocol, and/or some other protocol or combination of protocols.

If, on the other hand, platform accounts server 220 determines that the session token is not valid—e.g., based on platform accounts server 220 failing to authenticate the session token (block 615-NO), process 600 may further include sending a login instruction to user device 210 (block 625). For example, as described above with respect to login instruction 415, platform accounts server 220 may send login instruction 415 to user device 210. In some implementations, login instruction may cause user device 210 to display a login screen associated with partner accounts server 250 (e.g., to allow user device 210 to provide partner accounts server 250 with login credentials). An example of login instruction 415 is described above with respect to interface 110 of FIG. 1.

Process 600 may further include receiving a first authentication response from user device 210 (block 630). For example, as described above with respect to first authentication response 430, platform accounts server 220 may receive first authentication response 430 from user device 210 (e.g., as in input for a session request with platform accounts server platform accounts server 220). In some implementations, first authentication response 430 may include information authenticating user device 210 to access partner accounts server 250 via a session between user device 210 and platform accounts server platform accounts server 220. Additionally, first authentication response 430 may include a SAML token signed and/or encrypted by partner ID STS server 230. Additionally, or alternatively, first authentication response may include security assertions which may be interpretable only by partner FSTS server 240.

Process 600 may also include sending the first authentication response to partner FSTS server 240 (block 635). For example, as described above with respect to first authentication response 430, platform accounts server 220 may send first authentication response 430 to partner FSTS server 240 (e.g., to identify whether user device 210 is authenticated to access partner accounts server 250 via a session between user device 210 and platform accounts server 220). In some implementations, platform accounts server 220 may send first authentication response 430 to user device 210 using a secure transfer protocol, such as the HTTPS protocol, the SOAP protocol, and/or some other protocol or combination of protocols.

Process 600 may further include receiving a second authentication response (block 640). For example, as described above with respect to second authentication response 440, platform accounts server 220 may receive second authentication response 440 from partner FSTS server 240. In some implementations, second authentication response 440 may include information to indicate that user device 210 is authenticated to access partner accounts server 250 via a secure session with platform accounts server 220. Additionally, or alternatively, second authentication response 440 may include a SAML token with security assertions interpretable by platform accounts server 220.

Process 600 may also include decrypting and validating the second authentication response (block 645). For example, as described above with respect to decryption and validation function 445, platform accounts server 220 may decrypt second authentication response 440 (e.g., using a decryption key associated with platform accounts server 220 and/or some other technique) and validate second authentication response 440 (e.g., using a validation protocol to validate the signature associated with partner FSTS server 240).

Process 600 may further include generating a session token—e.g., a second session token (block 650). For example, as described above with respect to session token generation function 450, platform accounts server 220 may generate session token 455 based on decrypting and validating second authentication response 440. Additionally, platform accounts server 220 may receive a PCN, associated with second authentication response 440. As described above, session token 455 may include a session identifier, an expiration timestamp, an idle expiry timestamp, a session key encrypted by a public key associated with platform accounts server 220, a secure storage encrypted by the session key, a PCN associated with second authentication response 440, and/or an HMAC value stored by the secure storage.

Process 600 may further include sending the session token to user device 210 (block 655). For example, as described above, platform accounts server 220 may send session token 455 to user device 210, based on platform accounts server 220 generating session token 455. In some implementations, platform accounts server 220 may send session token 455 to user device using a secure transfer protocol, such as the HTTPS protocol, the SOAP protocol, and/or some other protocol or combination of protocols.

In some implementations, process 600 may correspond to a process for receiving a session token from user device 210 (e.g., as an input for a session request with platform accounts server 220), determining (e.g., by platform accounts server 220) whether the session token is valid (e.g., by authenticating the session token), and establishing a secure session with user device 210 based on determining that the session token is valid. Additionally, platform accounts server 220 may generate a session token based on sending an encrypted authentication message (e.g., information identifying if user device 210 is authenticated) to partner FSTS server 240 and receiving an encrypted second authentication response (e.g., information verifying, by partner FSTS server 240, that user device 210 is authenticated).

Figure 7:
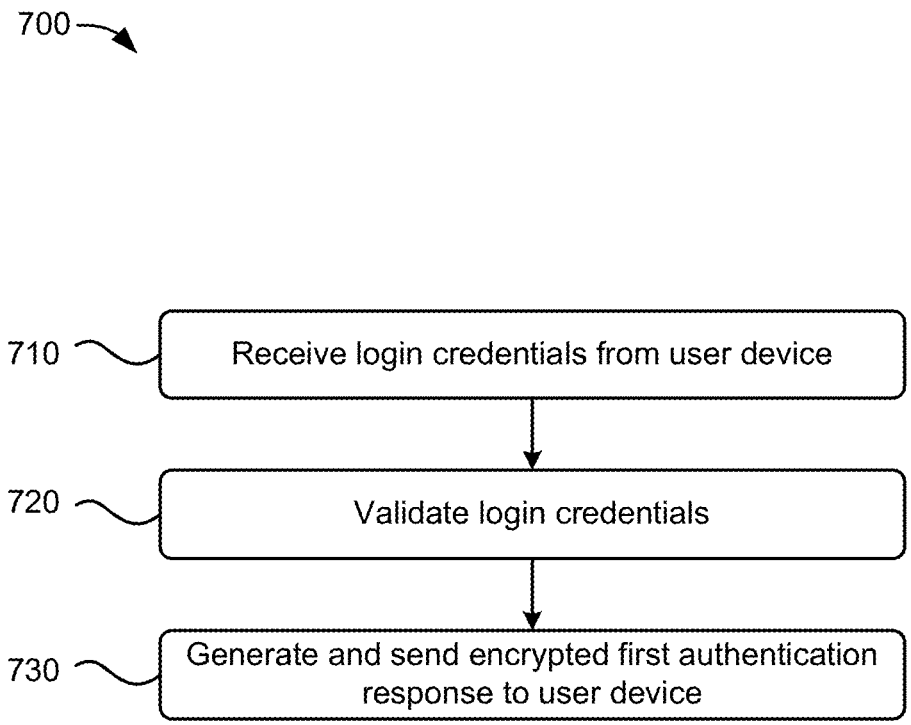
FIG. 7 illustrates a flowchart of an example process for authenticating a user device, and providing genuine authentication information to a server, such as a platform accounts server.

FIG. 7 illustrates a flowchart of an example process 700 for authenticating user device 210, and providing genuine authentication information to platform accounts server 220 (e.g., via a first authentication response). In one implementation, process 700 may be performed by one or more components of partner ID STS server 230, such as processor 310 of partner ID STS server 230. In another implementation, one or more blocks of process 700 may be performed by one or more components of another device (e.g., one or more of servers 220 and/or servers 240-260), or a group of devices including or excluding partner ID STS server 230.

As shown in FIG. 7, process 700 may include receiving login credentials from user device 210 (block 710). For example, as described above with respect to login credentials 420, partner ID STS server 230 may receive login credentials 420 when platform accounts server 220 sends a login instruction to user device 210 (e.g., when platform accounts server 220 determines that a session token, associated with a session request, is invalid).

Process 700 may further include validating the login credentials (block 720). For example, as described above with respect to login credentials authentication function 425, partner ID STS server 230 may store login information associated with a user account and may determine if the provided login credentials match the login credentials stored by partner ID STS server 230.

Process 700 may further include generating and sending an encrypted first authentication response to user device 210

(block 730). For example, as described above with respect to first authentication response 430, partner ID STS server 230 may generate first authentication response 430 based on validating the login credentials provided by user device 210. First authentication response 430 may include a SAML token to identify that user device 210 is authenticated to access partner accounts server 250 via a session with platform accounts server 220. In some implementations, first authentication response 430 may include a SAML token signed and/or encrypted by partner ID STS server 230. Additionally, or alternatively, first authentication response may include security assertions which may be interpretable only by partner FSTS server 240.

Process 700 may describe a function performed by partner ID STS server 230 to authenticate user device 210 to access partner accounts server 250 via a session with platform accounts server 220. Additionally, partner ID STS server 230 may generate an encrypted first authentication response with information authenticating user device 210. In some implementations, the encrypted first authentication response may ensure that platform accounts server 220 receives genuine authentication information for user device 210.

Figure 8:
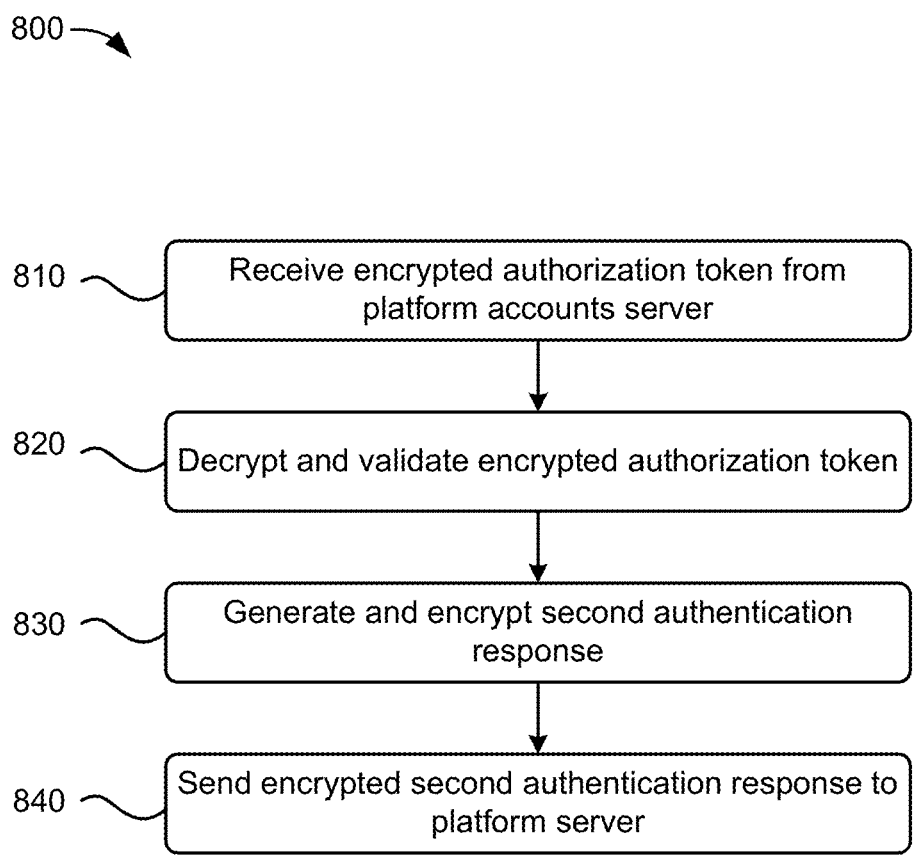
FIG. 8 illustrates a flowchart of an example process for receiving authentication information for a user device, and providing a genuine second authentication response to a server, such as a platform accounts server.

FIG. 8 illustrates a flowchart of an example process 800 for receiving authentication information for user device 210 (e.g., in the form of a first authentication response), and providing a genuine second authentication response to platform accounts server 220. In one implementation, process 800 may be performed by one or more components of partner FSTS server 240, such as processor 310 of partner FSTS server 240. In another implementation, one or more blocks of process 800 may be performed by one or more components of another device (e.g., one or more of servers 220-230 and/or servers 250-260), or a group of devices including or excluding partner FSTS server 240.

Process 800 may include receiving a first authentication response from platform accounts server 220 (block 810). For example, as described above with respect to first authentication response 430, partner FSTS server 240 may receive first authentication response 430 from platform accounts server 220 based on platform accounts server 220 receiving first authentication response 430 from user device 210 (e.g., as an input to a session request with platform accounts server 220).

Process 800 may further include decrypting and validating the encrypted authorization token (block 820). For example, as described above with respect to validation function 435, partner FSTS server 240 may initiate decryption and validation function 435 based on receiving first authentication response 430 (e.g., to identify whether partner ID STS server 230 authenticated user device 210 and to validate whether first authentication response 430 was created by partner ID STS server 230).

Process 800 may also include generating and encrypting a second authentication response (block 830). As described above with respect to second authentication response 440, partner FSTS server 240 may generate, encrypt, and/or sign second authentication response 440 based on decrypting and/or validating first authentication response 430. As described above, second authentication response 440 may include a SAML token with information to indicate that user device 210 is authenticated to access partner accounts server 250 via a secure session with platform accounts server 220.

Process 800 may further include sending the encrypted second authentication response to platform accounts server 220 (block 840). For example, as described above with respect to second authentication response 440, partner FSTS server 240 may send second authentication response 440 to platform accounts server 220 based on generating second authentication response 440. In some implementations, partner FSTS server 240 may send second authentication response 440 to platform accounts server 220 via a secure channel, such as the HTTPS protocol, the SOAP protocol, and/or some other protocol or combination of protocols.

In some implementations, process 800 may correspond to a process for receiving authentication information for user device 210 (e.g., in the form of a first authentication response), and providing a genuine second authentication response to platform accounts server 220. For example, partner FSTS server 240 may receive a first authentication response, decrypt the first authentication response to identify that user device 210 is authenticated (e.g., to access partner accounts server 250 via a session with platform accounts server 220), validate that the first authentication response was created by partner ID STS server 230 (e.g., by validating a signature associated with the first authentication response), generate and encrypt a second authentication response (e.g., a response including a SAML token or some other token) to identify that user device is authenticated, and send the second authentication response to platform accounts server 220. As a result, platform accounts server 220 may receive the second authentication response from partner FSTS server 240 after multiple layers of authentication and/or validation.

As described above, user device 210 may access content from content distribution server 260, associated with partner accounts server 250, based on establishing a session with platform accounts server 220 (e.g., to allow user device 210 to select and/or receive content via a content platform, associated with platform accounts server 220). User device 210 may be authenticated to establish a session with platform accounts server 220 based on multiple authentication responses between platform accounts server 220 and partner accounts server 250. User device 210 may establish a session with platform accounts server 220 without providing login credentials with each session request.

The foregoing description provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 6-8, the order of the blocks may be modified in other implementations. Further, non-dependent blocks may be performed in parallel.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a first server, a first token from a user device,
      the first token including information to authenticate the user device to communicate with the first server;
   determining, by the first server, that the first token is invalid;
   sending, by the first server, a login instruction to the user device, responsive to the determining that the first token is invalid,
      the login instruction requesting the user device to provide a set of credentials to a second server,
      the set of credentials being provided by the user device to the second server based on the login instruction, and
      the second server being different from the first server;
   receiving, by the first server, a first response from the user device,
      the first response being provided to the user device by the second server based on the user device providing the set of credentials to the second server, and
      the first response including information identifying whether the user device is authenticated to communicate with the first server;
   sending, by the first server, the first response to a third server,
      the third server generating a second response based on the first response,
      the third server being different from the first server and the second server,
      the second response including information that indicates that the user device is authenticated to communicate with the first server, and
      the second response being sent by the third server to the first server;
   receiving, by the first server, the second response from the third server;
   generating, by the first server, a second token, based on receiving the second response,
      the second token including information to authenticate the user device to communicate with the first server; and
   sending, by the first server, the second token to the user device.

2. The method of claim 1,
   where the second response is an encrypted second response,
   where the method further comprises:
      decrypting the encrypted second response; and
      validating a signature associated with the second response based on the decrypting of the encrypted second response, and
   where generating the second token comprises:
      generating the second token based on the validating of the signature associated with the second response.

3. The method of claim 1, further comprising:
   receiving a third token from a different user device;
   determining that the third token is valid; and
   establishing a session with the different user device based on the determining that the third token is valid.

4. The method of claim 1, where determining that the first token is invalid includes:
   calculating a first value based on a set of parameters;
   decrypting a first key, associated with the first token, via a second key associated with the first server;
   decrypting a third key, associated with the first token, using the decrypted first key;
   identifying a second value based on decrypting the third key;
   determining that the first value does not match the second value; and
   determining that the first token is invalid based on the determining that the first value does not match the second value.

5. The method of claim 1, where determining that the first token is invalid includes:
   identifying a timestamp associated with the first token;
   determining that the timestamp has expired based on a current time at which the first token was received by the first server;
   and
   determining that the first token is invalid based on the determining that the timestamp has expired.

6. The method of claim 1, where generating the second token includes:
   calculating a value based on a set of parameters;
   generating and encrypting a first key based on a second key associated with the first server;
   storing the value in a secure storage;
   encrypting the value, in the secure storage, based on the first key; and
   storing the encrypted value in the second token.

7. The method of claim 1, where generating the second token includes:
   generating a timestamp,
      the timestamp including information to identify an expiration time associated with the second token;
   generating a time period threshold,
      the time period threshold relating to an idle time period associated with the second token; and
   storing the timestamp and the time period threshold in the second token.

8. The method of claim 1,
   where the first server is associated with a first party, and
   where the first party is different from a second party that is associated with the second server and the third server.

9. A system comprising:
   a first server, at least partially implemented in hardware, to:
      receive a first token from a user device,
         the first token including information to authenticate the user device to communicate with the first server via a session with the first server;
      determine that the first token is invalid;
      send a login instruction to the user device responsive to the determining that the first token is invalid,
         the login instruction requesting the user device to provide a set of credentials to a second server,
         the set of credentials being provided by the user device to the second server based on the login instruction, and
         the second server being different from the first server;
      receive a first response from the user device,
         the first response being provided to the user device by the second server based on the user device providing the set of credentials to the second server, and the first response including information identifying
whether the user device is authenticated to communicate with the first server;
send the first response to a third server,
the third server generating a second response based on the first response,
the third server being different from the first server and the second server, and
the second response indicating authentication of the user device to communicate with the first server;
receive the second response from the third server;
generate a second token, based on the second response,
the second token including information that indicates that the user device is authenticated to communicate with the first server, and
the second response being sent by the third server to the first server;
send the second token to the user device; and
establish a session with the user device based on the second token.

10. The system of claim 9,
where the second response is an encrypted second response,
where the first server is further to:
decrypt the encrypted second response; and
validate a signature associated with the second response based on the decrypting of the encrypted second response, and
where, when generating the second token, the first server is to:
generate the second token based on the validating of the signature associated with the second response.

11. The system of claim 9, where the first server is further to:
receive a third token from a different user device;
determine that the third token is valid; and
establish a session with the different user device based on the determining that the third token is valid.

12. The system of claim 9, where, when determining that the first token is invalid, the first server is to:
calculate a first value based on a set of parameters;
decrypt a first key, associated with the first token, via a second key associated with the first server;
decrypt a third key, associated with the first token, using the decrypted first key;
identify a second value based on decrypting the third key;
determine that the first value does not match the second value; and
determine that the first token is invalid based on the determining that the first value does not match the second value.

13. The system of claim 9, where, when determining that the first token is invalid, the first server is to:
determine a current time at which the first token was received by the first server;
determine a time difference between a first time and a second time;
the first time corresponding to when the first token was previously received by the first server, and
the second time corresponding to the current time; and
determine that the first token is invalid based on the time difference.

14. The system of claim 9, where, when generating the second token, the first server is to:
calculate a value based on a set of parameters;
generate and encrypt a first key based on a second key associated with the first server;
encrypt the value based on the first key; and
store the encrypted value in the second token.

15. The system of claim 9, where, when generating the second token, the first server is to:
generate a timestamp,
the timestamp including information to identify an expiration time associated with the second token;
generate a time period threshold,
the time period threshold relating to an idle time period associated with the second token; and
store the timestamp and the time period threshold in the second token.

16. The system of claim 9,
where the first server is associated with a first party, and
where the first party is different from a second party that is associated with the second server and the third server.

17. A non-transitory computer-readable medium storing instructions, the instructions comprising:
a plurality of instructions which, when executed by one or more processors associated with a first server, cause the one or more processors to:
receive a first token from a user device,
the first token including information to authenticate the user device to communicate with the first server;
determine whether that the first token is invalid;
send a login instruction to the user device, based on responsive to the determining that the first token is invalid,
the login instruction requesting the user device to provide a set of credentials to a second server,
the set of credentials being provided by the user device to the second server based on the login instruction, and
the second server being different from the first server;
receive a first response from the user device,
the first response being provided to the user device by the second server based on the user device providing the set of credentials to the second server, and
the first response including information identifying whether the user device is authenticated to communicate with the first server;
send the first response to a third server,
the third server generating a second response based on the first response,
the third server being different from the first server and the second server,
the second response including information that indicates that the user device is authenticated to communicate with the first server, via a session with the first server, and
the second response being sent by the third server to the first server;
receive the second response from the third server;
generate a second token, based on the second response,
the second token including information to authenticate the user device to communicate with the first server via a session with the first server;
send the second token to the user device; and
establish a session between the user device and the first server based on the second token.

18. The non-transitory computer-readable medium of claim 17,
where the second response is an encrypted second response, where the instructions further comprise:
one or more instructions which, when executed by the one or more processors ae further, cause the one or more processors to:
decrypt the encrypted second response; and
validate a signature associated with the second response based on the decrypting of the encrypted second response, and
where one or more instructions, of the plurality of instructions, to generate the second token include:
one or more instructions which, when executed by the one or more processors, cause the one or more processors to:
generate the second token based on the validating of the signature associated with the second response.

19. The non-transitory computer-readable medium of claim 17, where one or more instructions, of the plurality of instructions, to determine that the first token is invalid, include:
one or more instructions which, when executed by the one or more processors, cause the one or more processors to:
calculate a first value based on a set of parameters;
decrypt a first key, associated with the first token, via a second key associated with the first server;
decrypt a third key, associated with the first token, using the decrypted first key;
identify a second value based on decrypting the third key;
determine that the first value does not match the second value; and
determine that the first token is invalid based on the determining that the first value does not match the second value.

20. The non-transitory computer-readable medium of claim 17, where one or more instructions, of the plurality of instructions, to determine that the first token is invalid, include:
one or more instructions which, when executed by the one or more processors, cause the one or more processors to:
identify a timestamp associated with the first token;
determine whether the timestamp has expired based on a current time at which the first token was received by the first server;
determine a time difference between a first time and a second time;
the first time corresponding to when the first token was previously received by the first server,
the second time corresponding to the current time; and
determine that the first token is invalid based on the time difference.

21. The non-transitory computer-readable medium of claim 17, where one or more instructions, of the plurality of instructions, to generate the second token include:
one or more instructions which, when executed by the one or more processors, cause the one or more processors to:
calculate a value based on a set of parameters;
generate and encrypt a first key based on a second key associated with the first server;
store the value in a secure storage;
encrypt the value, in the secure storage, based on the first key; and
store the encrypted value in the second token.

22. The non-transitory computer-readable medium of claim 17, where one or more instructions, of the plurality of instructions, to generate the second token include:
one or more instructions which, when executed by the one or more processors, cause the one or more processors to:
generate a timestamp,
the timestamp including information to identify an expiration time associated with the second token;
generate a time period threshold,
the time period threshold relating to an idle time period associated with the second token; and
store the timestamp and the time period threshold in the second token.

23. The non-transitory computer-readable medium of claim 17, where the first server is associated with a first party, and
where the first party is different from a second party that is associated with the second server and the third server.

* * * * *